(12) United States Patent
Ko et al.

(10) Patent No.: US 8,184,752 B2
(45) Date of Patent: May 22, 2012

(54) APPARATUS AND METHOD FOR HYBRID AUTOMATIC REPEAT REQUEST (HARQ) IN WIRELESS COMMUNICATION SYSTEM

(75) Inventors: Eun-Seok Ko, Seongnam-si (KR);
Yung-Soo Kim, Seongnam-si (KR);
Myeon-Kyun Cho, Seongnam-si (KR);
Eun-Yong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 870 days.

(21) Appl. No.: 12/287,104

(22) Filed: Oct. 6, 2008

(65) Prior Publication Data

US 2009/0097586 A1  Apr. 16, 2009

(30) Foreign Application Priority Data

Oct. 15, 2007  (KR) .................. 10-2007-0103386

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/347; 375/299; 375/267; 375/260; 375/221; 455/500; 455/101

(58) Field of Classification Search .................. 375/346, 375/347, 299, 267, 260, 221; 455/500, 101
See application file for complete search history.

(56) References Cited

U.S. PATENT DOCUMENTS

| | | | |
|---|---|---|---|
| 7,894,505 B2 * | 2/2011 | Zhou et al. ................... | 375/141 |
| 7,907,677 B2 * | 3/2011 | Li et al. ......................... | 375/267 |
| 2007/0183380 A1 * | 8/2007 | Rensburg et al. ............. | 370/338 |
| 2007/0254652 A1 * | 11/2007 | Khan et al. .................. | 455/435.1 |
| 2007/0280116 A1 * | 12/2007 | Wang et al. ................... | 370/236 |
| 2008/0013610 A1 * | 1/2008 | Varadarajan et al. ......... | 375/221 |
| 2008/0056414 A1 * | 3/2008 | Kim et al. ..................... | 375/347 |
| 2008/0125051 A1 * | 5/2008 | Kim et al. .................. | 455/67.13 |

OTHER PUBLICATIONS

U.S. Appl. No. 11/896,479, filed Aug. 31, 2007.*

* cited by examiner

Primary Examiner — Phuong Phu

(57) ABSTRACT

A Multiple-Input Multiple-Output (MIMO) wireless communication system is provided. A receiving end includes a selector for selecting at least one stream for a MultiUser (MU) mode; a first generator for generating per stream channel quality information for the at least one selected stream as at least one candidate for channel information for the MU mode; and a determiner for determining one per stream channel quality information of the candidates as channel information for the MU mode.

20 Claims, 6 Drawing Sheets

| PRECODING INDEX | RANK | SU MODE FIRST STREAM SINR | SU MODE SECOND STREAM SINR | SU MODE THIRD STREAM SINR | SU MODE FOURTH STREAM SINR |
|---|---|---|---|---|---|

FIG.1A

| PRECODING INDEX | RANK | SU MODE SECOND STREAM SINR | SU MODE THIRD STREAM SINR | MU MODE SECOND STREAM SINR | MU MODE THIRD STREAM SINR |
|---|---|---|---|---|---|

FIG.1B

| PRECODING INDEX | RANK | MU MODE SECOND STREAM SINR | SU MODE SECOND STREAM SINR | SU MODE THIRD STREAM SINR | MU MODE THIRD STREAM SINR |
|---|---|---|---|---|---|

FIG.1C

APPARATUS AND METHOD FOR HYBRID AUTOMATIC REPEAT REQUEST (HARQ) IN WIRELESS COMMUNICATION SYSTEM

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Oct. 15, 2007 and assigned Serial No. 2007-103386, the entire disclosure of which is hereby incorporated by reference.

TECHNICAL FIELD OF THE INVENTION

The present invention relates generally to a Multiple-Input Multiple-Output (MIMO) wireless communication system. More particularly, the present invention relates to an apparatus and a method for distributing streams on a user basis in a MultiUser (MU) MIMO wireless communication system.

BACKGROUND OF THE INVENTION

In accordance with the increasing demands for high-speed and high-quality data transmissions, a Multiple-Input Multiple-Output (MIMO) wireless communication system using a plurality of transmit antennas and receive antennas is attracting much attention as a technique to meet those demands. MIMO technology performs communications using a plurality of streams via the antennas to thus greatly enhance the channel capacity compared to a single-antenna system. For example, when the transmitting end and the receiving end employ M-ary transmit antennas and M-ary receive antennas respectively, channels of the antennas are independent of each other, a bandwidth and a total transmit power are fixed, and an average channel capacity increases by M times the single antenna.

To maximize the performance of MIMO technology, a MultiUser (MU) MIMO technique is suggested to transmit signals to multiple users over the multiple transmit antennas at the same time. The MU MIMO technique achieves all of a spatial diversity gain, a spatial multiplexing gain, and an MU diversity gain. Thus, the MU MIMO is receiving much attention as the technique for maximizing the gain of a MIMO system.

Detection methods for maximizing the performance of the MIMO technique include Maximum Likelihood (ML) detection. The ML detection detects a signal in the unit of a vector by considering a transmit signal vector including a plurality of streams as one unit. Accordingly, when per stream channel information is generated, a Modulation and Coding Scheme (MCS) level (i.e., a modulation order) of each stream affects an effective channel quality of the other streams.

To determine the MCS level of the transmitting end, the receiving end needs to feed back per stream channel quality information. In a single user mode in a system using ML detection, all of the streams are allocated to one receiving end. There is no inconsistency between the channel information fed back by the receiving end and the MCS level determined by the transmitting end. Consequently, the receiving end is able to predict the MCS level of every stream and is able to generate accurate channel quality information. By contrast, in the MU mode, the streams are distributed to the multiple receivers. Accordingly, the MCS level of each stream is determined after the stream allocation is completed. The receiving end does not know which MCS level the transmitting end determines until the stream allocation is completed. In view of the receiving end using ML detection, the unknown MCS level of some streams implies that it is impossible to generate the channel quality information of the other streams.

As discussed above, since the streams are distributed to multiple receiving ends in the MU mode of the MIMO system, the receiver using ML detection cannot generate the per stream channel quality information. The transmitting end needs to determine whether to enter the MU mode or the single user mode. For doing so, the receiver should feed back proper channel information regarding the two modes. To this end, in a MIMO wireless communication system using ML detection, a method for generating the channel information for the MU mode, constituting the feedback information, and determining the mode using the feedback information is needed.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide an apparatus and a method for generating channel information for a MultiUser (MU) mode of a receiving end using Maximum Likelihood (ML) detection in a Multiple-Input Multiple-Output (MIMO) wireless communication system.

Another aspect of the present invention is to provide an apparatus and a method for constituting feedback information required for a transmitting end, which communicates with a plurality of receiving ends, to select a mode in a MIMO wireless communication system.

Yet another aspect of the present invention is to provide an apparatus and a method for determining either a Single User (SU) mode or an MU mode in a MIMO wireless communication system.

Still another aspect of the present invention is to provide an apparatus and a method for selecting receiving ends to communicate in an MU mode in a MIMO wireless communication system.

The above aspects are achieved by providing an apparatus for a receiving end in a MIMO wireless communication system. The apparatus includes a selector for selecting at least one stream for an MU mode; a first generator for generating a plurality of per stream channel quality information for the at least one selected stream as a plurality of candidate for channel information for the MU mode; and a determiner for determining one per stream channel quality information of the candidates as channel information for the MU mode.

According to one aspect of the present invention, an apparatus for a transmitting end which communicates with a plurality of receiving ends in a MIMO wireless communication system includes a checker for checking feedback information received from the receivers; and a scheduler for determining one of an SU mode or an MU mode based on the feedback information and determining at least one receiving end with which to communicate.

According to another aspect of the present invention, an operating method of a receiving end in a MIMO wireless communication system includes selecting at least one stream for an MU mode; generating a plurality of per stream channel quality information for the at least one selected stream, as a plurality of candidate for channel information for the MU mode; and determining one per stream channel quality information of the candidates as channel information for the MU mode.

According to yet another aspect of the present invention, an operating method of a transmitting end which communicates with a plurality of receiving ends in a MIMO wireless communication system includes checking feedback information received from the receivers; and determining one of an SU mode or an MU mode based on the feedback information and determining at least one receiving end with which to communicate.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A-1C illustrates a feedback information constitution in a MIMO wireless communication system according to an exemplary embodiment of the present invention;

DETAILED DESCRIPTION OF THE INVENTION

Figure 2:
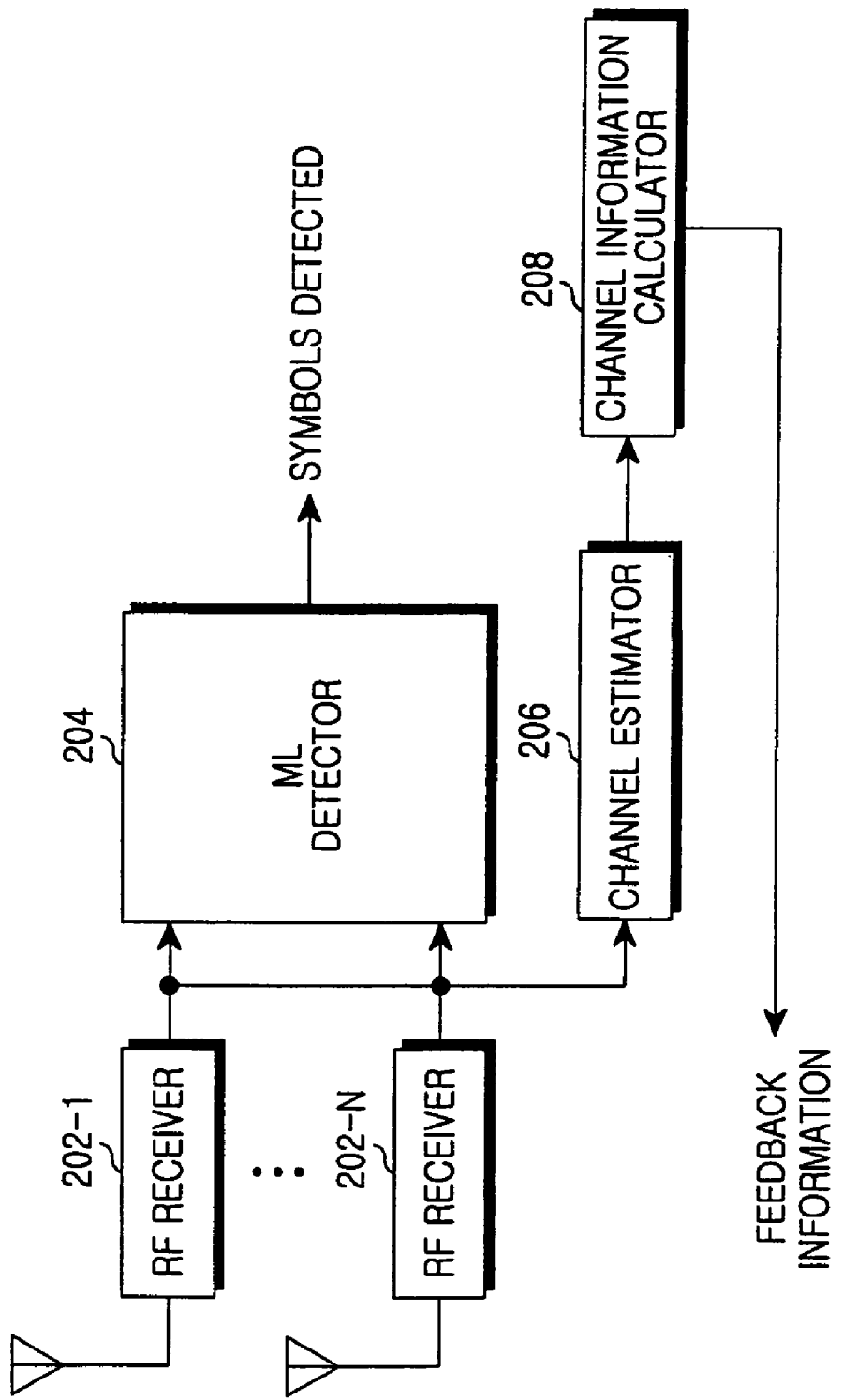
FIG. 2 illustrates a receiving end in the MIMO wireless communication system according to an exemplary embodiment of the present invention.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for constituting feedback information, a technique for selecting users, and a technique for determining a mode in a Multiple-Input Multiple-Output (MIMO) wireless communication system. The present invention considers users who use Maximum Likelihood (ML) detection.

A channel information calculation for a MultiUser (MU) mode of a receiving end according to the present invention is now described. Hereinafter, the channel information is per stream Signal to Interference and Noise Ratios (SINRs) by way of example.

The receiving end selects a rank and a stream by calculating the per stream SINRs for a Single User (SU) mode. In the per stream SINR calculation for the SU mode, at least one stream to be used is determined. An example of the per stream SINR calculation is illustrated in brief. The receiving end calculates Pairwise Error Rates (PERs) with respect to the determined modulation order combinations, and calculates an upper bound of per stream Symbol Error Rates (SERs) using the PERs. The receiving end calculates a plurality of the per stream SINRs corresponding to the modulation order combination by converting the upper bound of the SER to the SINR, and selects one per stream SINRs having a maximum sum rate. In doing so, elements of the modulation order combination include unused null to thus select the stream at the same time. This per stream SINR calculation is a mere example, and the present invention is applicable to other per stream SINR calculations.

The stream selected through the per stream SINR calculation for the SU mode has a higher SINR than the unselected streams. Naturally, even when the selected stream is used for the MU mode, it still has a higher SINR than the unselected streams. Using this property, the receiving end calculates the per stream SINRs for the MU mode with respect to the stream selected for the SU mode.

To compute the per stream SINRs, the receiving end should know the Modulation and Coding Scheme (MCS) level information, particularly, the modulation order of every stream because ML detection detects the receive signals of the streams in the unit of the vector by binding the signals by one vector. Thus, the modulation order of a specific stream affects the detection performance of the other streams. Typically, the higher the modulation order of the specific stream, the lower the detection performance of the other streams. However, as aforementioned, the receiving end cannot know the modulation order of the unselected streams. Therefore, the receiving end calculates the per stream SINRs by assuming the maximum modulation order or the most influential modulation order with respect to the unselected streams (i.e., the streams to be allocated to the other receiving ends). As such, by calculating the per stream SINRs under the worst condition assumed, the available per stream SINRs are calculated regardless of the modulation order actually applied to the unselected streams. That is, the minimum per stream SINRs are produced with the stream selected.

That is, the receiving end allocates the maximum modulation order to the unselected streams, sequentially substitutes the modulation order combinations of the other selected streams, and calculates the per stream SINRs corresponding to the modulation order combinations respectively. Excluding the unselected stream, the receiving end selects the modulation order combination which guarantees the maximum sum rate for the selected stream, and determines the per stream SINRs corresponding to the selected modulation order combination as channel information for the MU mode. Yet, the per stream SINR finally selected should meet a required SINR of the corresponding modulation scheme.

More particularly, when the transmitting end includes two transmit antennas and the receiving end includes two receive antennas, the channel information for the MU mode is calculated as follows. It is assumed that the receiving end determines the rank '1' and selects the first stream and that the adoptable modulation schemes include a Binary Phase Shift Keying (BPSK), a Quadrature Phase Shift Keying (QPSK), and a 16 Quadrature Amplitude Modulation (QAM).

The receiving end allocates the 16 QAM of the maximum order to the unselected second stream, and calculates the per stream SINRs of each of the modulation order combinations [BPSK, 16 QAM], [QPSK, 16 QAM], and [16 QAM, 16 QAM] which allocates the modulation order to the selected first stream. The receiving end determines whether the SINR calculated for the first stream meets the required SINR of the corresponding modulation order, and excludes the unsatisfying modulation order combination from the candidates. Next, the receiving end determines the SINR guaranteeing the maximum sum rate for the first stream (i.e., the SINR corresponding to the maximum-order modulation scheme among the modulation order combinations meeting the required SINR) as the channel information for the MU mode.

When the receiving end can support the 16 QAM of the maximum modulation order allocated to the unselected second stream, the per stream SINRs of [BPSK, 16 QAM], [QPSK, 16 QAM], and [16 QAM, 16 QAM] are already acquired in the initial stream selection. Accordingly, after allocating the maximum modulation order to the unselected second stream, the receiving end can reuse the obtained per stream SINRs without calculating the per stream SINRs of [BPSK, 16 QAM], [QPSK, 16 QAM], and [16 QAM, 16 QAM]. By contrast, when the receiving end cannot support the 16 QAM of the maximum modulation order allocated to the unselected second stream, the receiving end needs to recalculate the per stream SINRs of [BPSK, 16 QAM], [QPSK, 16 QAM], and [16 QAM, 16 QAM] because the per stream SINRs of those modulation order combinations are not obtained in the initial stream selection.

The receiving end feeds the acquired channel information for the MU mode back to the transmitting end. The feedback information is constituted as below.

The feedback information can be constituted in two types. In the first type, the feedback information includes rank information and NR-ary SINR information. The feedback information of the second type includes stream selection information and NR-ary SINRs. When using the beamforming scheme, the feedback information of both types further includes a preceding index. Herein, it is advantageous that NR is limited to the number of streams of the transmitting end to reduce overhead on the feedback information. In some cases, NR can be set to a number greater than the number of the streams of the transmitting end.

When the rank in the feedback information is equal to the number of the transmit antennas, it implies that the corresponding receiving end supports only the SU mode and all the SINRs in the feedback information are the per stream SINRs for the SU mode. For example, when the rank is equal to the number of the streams of the transmitting end, the feedback information is constituted as shown in FIG. 1A. The feedback information of FIG. 1A includes preceding index, rank information, and per stream SINRs for the SU mode.

By contrast, when the rank of the feedback information is smaller than the number of the streams of the transmitting end, the feedback information includes both of the per stream SINRs for the MU mode and the per stream SINRs for the SU mode. In this case, the per stream SINRs for the two modes are distinguished based on the form of the rank information and the stream selection information. When the rank information includes the stream selection information, the per stream SINRs for the SU mode are bound and arranged in sequence, and the per stream SINRs for the MU mode are bound and arranged in sequence. For example, when the per stream SINRs for the SU mode are arranged ahead, the feedback information is constituted as shown in FIG. 1B. The feedback information of FIG. 1B includes the preceding index, the rank information, and the per stream SINRs for the SU mode, and the per stream SINRs for the MU mode. Receiving the feedback information of FIG. 1B, the transmitting end confirms the number and the type of the selected streams based on the rank information, confirms the per stream SINRs for the SU mode in order, and then confirms the per stream SINRs for the MU mode.

When the rank information does not include the stream selection information, the SINRs for the SU mode are first arranged in the corresponding stream positions and then the SINRs for the MU mode are arranged in the remaining positions. For example, when the second stream and the third stream are selected, the feedback information is constituted as shown in FIG. 1C. As shown in FIG. 1C, the per stream SINRs for the SU mode are arranged in the positions corresponding to the second stream and the third stream and then the per stream SINRs for the MU mode in relation to the second stream and the third stream are arranged in the other positions. Since the per stream SINR for the SU mode is mostly greater than the per stream SINR for the MU mode, the transmitting end can distinguish the per stream SINR for the SU mode and the per stream SINR for the MU mode by comparing the magnitude of the SINRs. Yet, given a great number of streams, it is hard to know which SINRs are the pair of the SU mode and the MU mode. To avoid this problem, it is preferable to agree to a rule for the comparison between the receiving end and the transmitting end.

In FIG. 1, there are four spaces for containing the SINRs in the feedback information. Yet, when three streams are selected, it is necessary to deliver six SINRs including three per stream SINRs for the SU mode and three per stream SINRs for the MU mode. In this case, the receiving end includes only the per stream SINRs of the selected mode in the feedback information by extending the size of the feedback information or by selecting one mode according to the agreed rule.

Upon receiving the feedback information constituted as above, the transmitting end selects a user mode and transmits a signal. The transmitting end selects the user mode and the receiving end to maximize the stream sum rate in all the possible cases. That is, the transmitting end searches combinations having the maximum sum rate among the possible receiving end combinations of the MU mode, and searches receiving ends having the maximum sum rate in the SU mode among the receiving ends. Next, the transmitting end selects the user mode and the receiving end having the greater sum rate amongst the combinations of the maximum sum rate in the MU mode and the receiving ends of the maximum sum rate in the SU mode.

Now, structures and operations of the receiving end and the transmitting end are explained in detail by referring to the drawings.

FIG. 2 is a block diagram of the receiving end in the MIMO wireless communication system according to an exemplary embodiment of the present invention.

The receiving end of FIG. 2 includes a plurality of radio frequency (RF) receivers 202-1 through 202-N, an ML detector 204, a channel estimator 206, and a channel information calculator 208.

The RF receivers 202-1 through 202-N convert an RF signal received via the respective antennas to a baseband signal. The ML detector 204 estimates a transmit signal vector from the receive signal vector according to the ML detection. The channel estimator 206 estimates a channel using a pre-designated receive signal (for example, using a pilot signal). The channel estimator 206 constitutes an effective channel matrix by taking into account the signal processing on the transmit signal vector at the transmitting end and the signal processing on the receive signal vector at the receiving end. For example, the effective channel matrix is a substantial channel matrix indicative of the relation between the transmit signal and the receive signal by considering all the intentional processings (e.g., transmitting end weight matrix, transmitting end power allocation matrix, and receiving end weight matrix) on the signals. That is, the channel estimator 206 calculates and provides the effective channel matrix and an average noise power of the channel to the channel information calculator 208. Although it is not depicted in FIG. 2, when beamforming is used between the transmitting end and the receiving end, the receiving end further includes a weight multiplier for multiplying the receive signal vector by the receive weight matrix and provides the product to the ML detector 204.

The channel information calculator 208 calculates channel information for the MU mode and channel information for the SU mode. For example, the channel information can be one of the per stream SINRs, per stream Carrier to Interference and Noise Ratios (CINRs), and per stream Signal to Noise Ratios (SNRs). The structure and the function of the channel information calculator 208 are illustrated in further detail by referring to FIG. 3.

Figure 3:
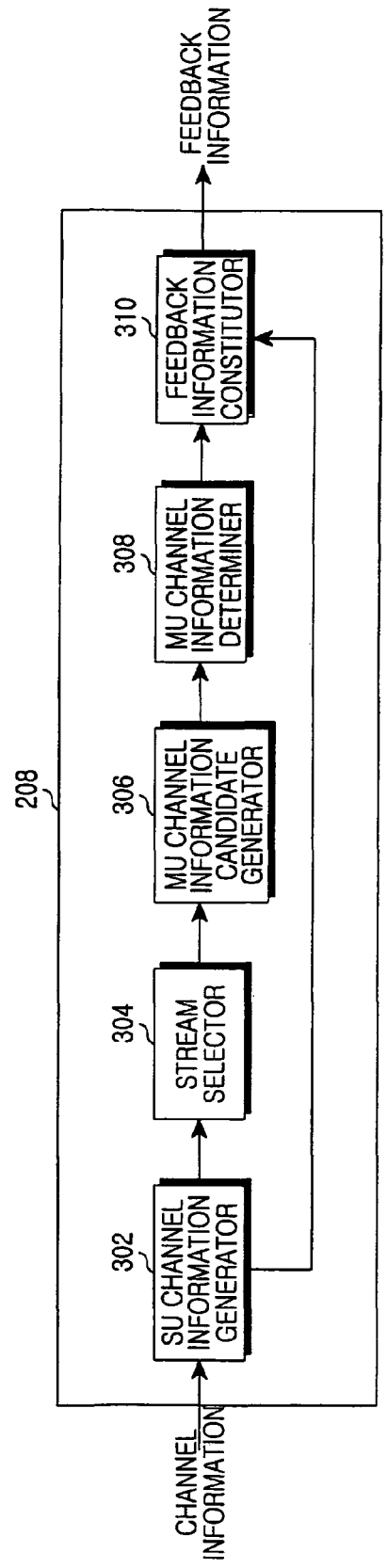
FIG. 3 illustrates a channel information calculator in the MIMO wireless communication system according to an exemplary embodiment of the present invention.

FIG. 3 is a block diagram of the channel information calculator 208 in the MIMO wireless communication system according to an exemplary embodiment of the present invention.

The channel information calculator 208 of FIG. 3 includes an SU channel information generator 302, a stream selector 304, an MU channel information candidate generator 306, an MU channel information determiner 308, and a feedback information constitutor 310.

The SU channel information generator 302 generates the channel information for the SU mode. Herein, the channel information for the SU mode includes the rank or the stream selection information and the perstream channel quality information of the selected stream, and the channel quality information can be one of the SINR, the CINR, and the SNR. For example, to calculate the per stream SINRs, the SU channel information generator 302 calculates the PER of each of the possible modulation order combinations, and calculates the upper bound of the per stream SER using the PER. The receiving end calculates a plurality of per stream SINRs corresponding to the modulation order combinations by converting the upper bound of the SER to the SINR, and selects one per stream SINRs having the maximum sum rate. In doing so, the elements of the modulation order combination include null not using the stream so as to achieve the stream selection simultaneously. Note that the per stream SINR calculation is just an exemplary implementation, and that the present invention is applicable to other per stream SINR calculations.

The stream selector 304 selects the streams for the MU mode. The stream selector 304 selects the streams for the SU mode selected by the SU channel information generator 302 as the streams for the MU mode.

The MU channel information candidate generator 306 generates the per stream channel quality information of the streams for the MU mode selected by the stream selector 304. For example, the channel quality information can be one of the SINR, the CINR, and the SNR. More specifically, the MU channel information candidate generator 306 allocates the maximum modulation order to the unselected stream. To calculate the channel information for the MU mode, the MU channel information candidate generator 306 assumes that the maximum modulation order is applied to the stream not used by the receiving end. The MU channel information candidate generator 306 sequentially substitutes the possible modulation order combinations to the selected streams (i.e., the streams to be used by the receiving end) and calculates the per stream channel quality information corresponding to the modulation order combinations (i.e., candidates of the channel information) for the MU mode. The per stream channel quality information is acquired in the same manner as the per stream channel quality information generation for the SU mode of the SU channel information generator 302. In other words, the MU channel information candidate generator 306 calculates the PER of each of the modulation order combinations, calculates the upper bound of the per stream SER using the PER, converts the upper bound of the SER to the channel quality, and thus acquires the per stream SINRs. When the modulation order combinations include the modulation order combination which generates the per stream channel quality at the SU channel information generator 302, the MU channel information candidate generator 306 reuses the per stream channel quality generated at the SU channel information generator 302 without generating the per stream channel quality of the overlapping modulation order combinations.

The MU channel information determiner 308 selects one of the candidates of the channel information for the MU mode generated at the MU channel information candidate generator 306 as channel information for the MU mode. For doing so, the MU channel information determiner 308 excludes the per stream channel quality information not meeting the required channel quality of the corresponding modulation order. Next, the MU channel information determiner 308 selects the per stream channel quality information having the maximum sum rate in relation with the selected streams amongst the other per stream channel quality information as channel information for the MU mode.

The feedback information constitutor 310 constitutes feedback information including at least one of the channel information for the MU mode determined at the MU channel information determiner 308 and the channel information for the SU mode generated at the SU channel information generator 302. When all of the streams are selected (i.e., when the MU mode is not supported), the channel quality information includes only the channel quality information for the SU mode. When some streams are selected (i.e., when the MU mode is supported), the channel quality information includes the channel quality information of the two modes, the SU mode and the MU mode, and all of the modes. The feedback information includes the rank or the selected stream information and the per stream channel quality information of the selected streams. Using a beamforming scheme, the feedback information further includes preceding index information. For example, the feedback information can employ one of the structures in FIG. 1.

Figure 4:
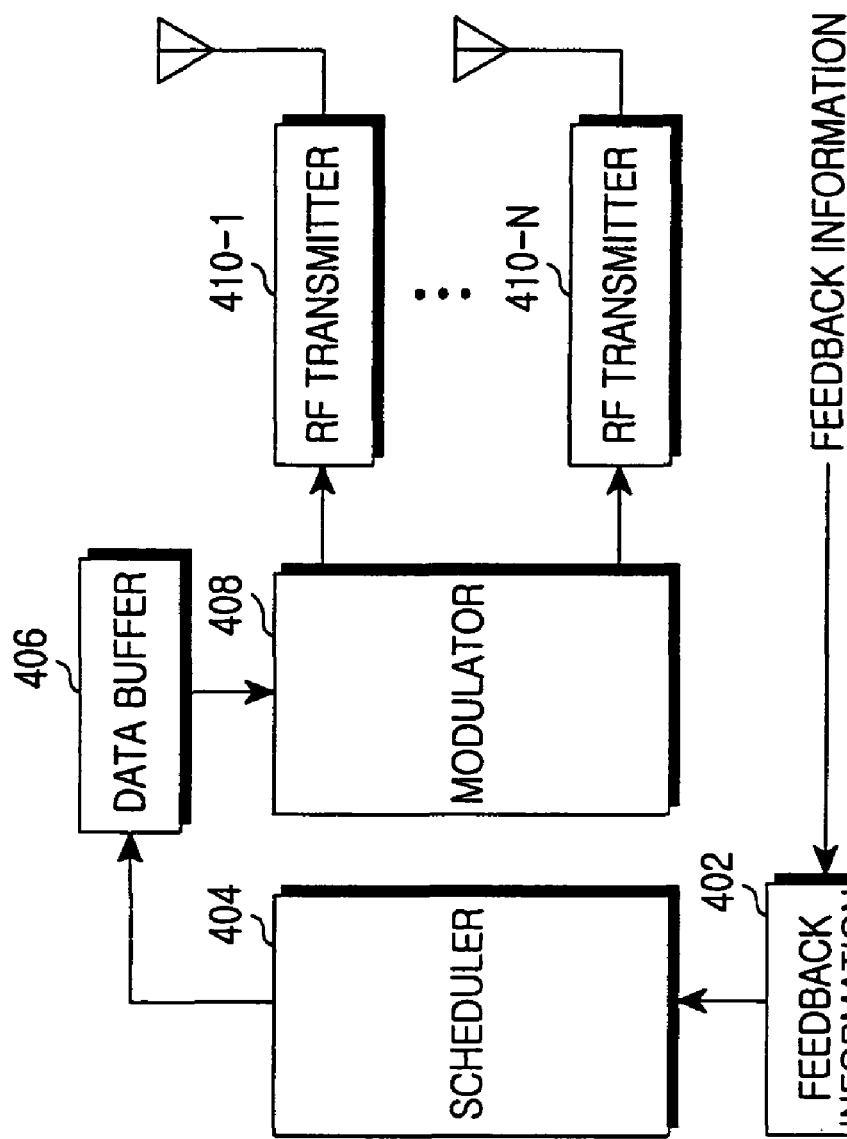
FIG. 4 illustrates a transmitting end in the MIMO wireless communication system according to an exemplary embodiment of the present invention.

FIG. 4 is a block diagram of the transmitting end in the MIMO wireless communication system according to an exemplary embodiment of the present invention.

The transmitting end of FIG. 4 includes a feedback information checker 402, a scheduler 404, a data buffer 406, a modulator 408, and a plurality of RF transmitters 410-1 through 410-N.

The feedback information checker 402 confirms at least one of the channel information for the SU mode and the channel information for the MU mode of each receiving end from the feedback information fed back from the receivers. When the feedback information includes only the channel information for the SU mode, it implies that the corresponding receiving end supports only the SU mode. The feedback information includes the rank or the selected stream information and the per stream channel quality information of the selected streams. Using the beamforming scheme, the feedback information further includes the preceding index information. For example, the feedback information can employ one of the structures in FIG. 1.

The scheduler 404 determines the mode based on the channel information for the SU mode and the channel information for the MU mode of each receiving end as confirmed by the feedback information checker 402, and selects at least one receiving end to communicate with. For doing so, the scheduler 404 classifies the per stream channel quality information of the feedback information based on the mode, and searches for the case supporting the maximum sum rate in each mode. Next, the scheduler 404 determines the mode having the greater maximum sum rate as the execution mode, and instructs the data buffer 406 to output data to the receiving end which provides the maximum sum rate in the determined mode.

The data buffer 406 stores data to be transmitted to the receiving ends, and outputs corresponding data according to the scheduling of the scheduler 404. The modulator 408 modulates and converts the bit stream output from the data buffer 406 to complex symbols. The RF transmitters 410-1 through 410-N up-convert the complex symbols output from the modulator 408 to an RF signal and transmit the RF signal via the corresponding antenna. Although it is not illustrated in FIG. 4, when beamforming is used between the transmitting end and the receiving end, the transmitting end further includes a weight multiplier for multiplying the transmit signal vector output from the modulator 408 by the transmit weight matrix.

Figure 5:
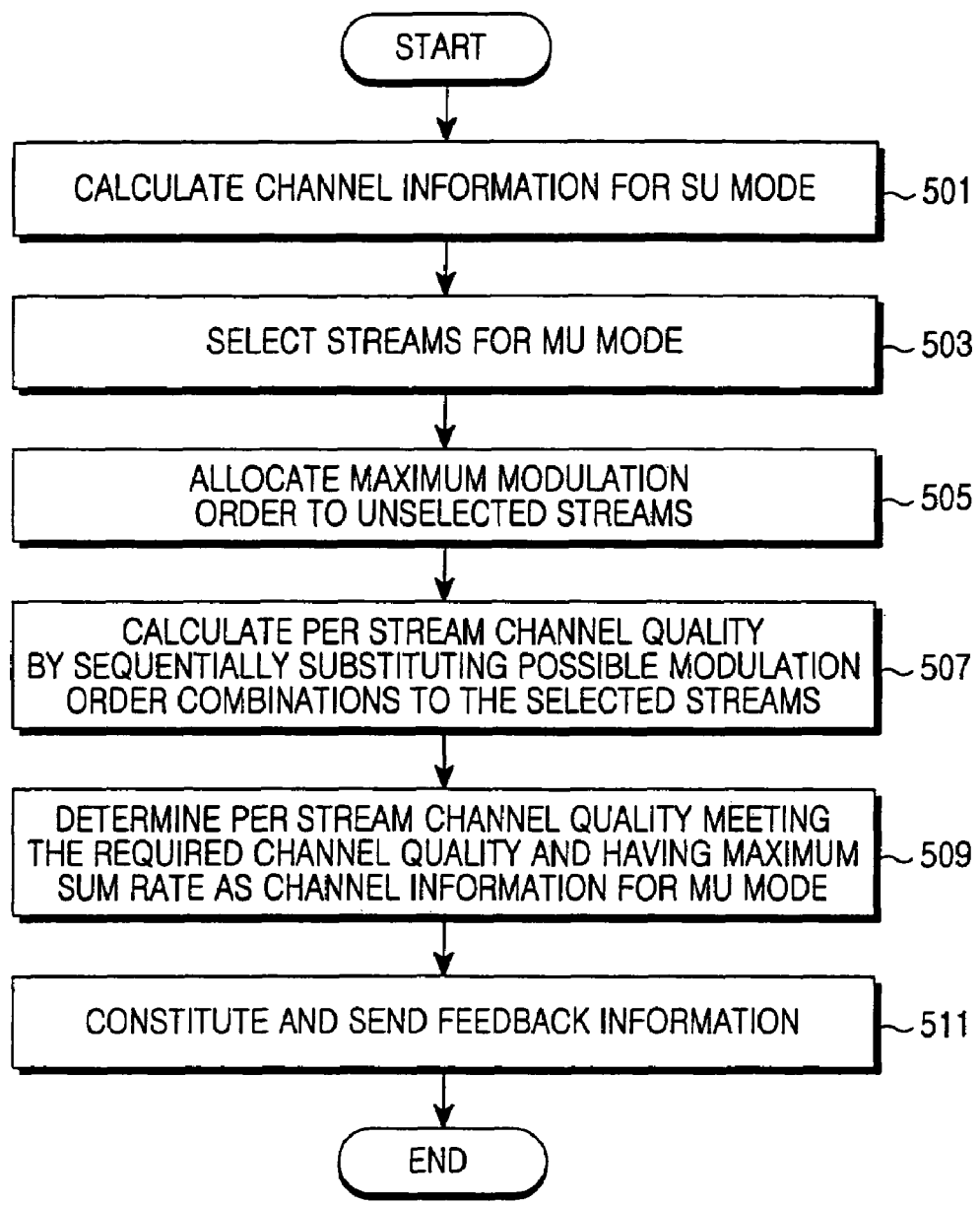
FIG. 5 illustrates a method of the receiving end for constituting the feedback information in the MIMO wireless communication system according to an exemplary embodiment of the present invention.

FIG. 5 is a flowchart illustrating a method of the receiving end for constituting the feedback information in the MIMO wireless communication system according to an exemplary embodiment of the present invention.

In step 501, the receiving end calculates the channel information for the SU mode. Herein, the channel information for the SU mode includes the rank or the stream selection information and the per stream channel quality information of the selected streams. The channel quality information can be one of the SINR, the CINR, and the SNR. For example, to calculate the per stream SINRs, the receiving end computes the PER of the possible modulation order combinations and computes the upper bound of the per stream SER using the PER. Next, the receiving end calculates the a plurality of per stream SINRs corresponding to the modulation order combinations by converting the upper bound of the SER to the SINR, and selects one per stream SINR having the maximum sum rate. The elements of the modulation order combination include null not using the stream, thus achieving the stream selection at the same time. This per stream SINR calculation is a mere example, and the present invention is applicable to other per stream SINR calculations.

In step 503, the receiving end determines the streams selected through the channel information calculation for the SU mode as the streams for the MU mode.

In step 505, the receiving end allocates the maximum modulation order to the unselected streams. That is, to obtain the channel information for the MU mode, the receiving end assumes that the maximum modulation order is applied to the streams not used by the receiving end.

In step 507, the receiving end calculates the per stream channel quality information corresponding to the modulation order combinations by sequentially substituting the possible modulation order combinations to the selected streams (i.e., to the streams to be used by the receiving end). The channel quality information is calculated in the same manner as in step 501. In more detail, the receiving end computes the PER of the possible modulation order combinations, computes the upper bound of the per stream SER using the PER, and calculates a plurality of per stream SINRs by converting the upper bound of the SER to the SINR. Notably, when the modulation order combinations include the modulation order combination which generates the per stream channel quality in step 501, the receiving end reuses the per stream channel quality generated in step 501 without generating the per stream channel quality of the overlapping modulation order combination.

In step 509, the receiving end determines one of the per stream channel quality information corresponding to the modulation order combinations as the channel information for the MU mode. More specifically, the receiving end excludes the per stream channel quality information not meeting the required channel quality of the corresponding modulation order, and determines the per stream channel quality information having the maximum sum rate for the selected streams amongst the remaining per stream channel quality information as the channel information for the MU mode.

In step 511, the receiving end constitutes the feedback information including at least one of the channel information for the MU mode and the channel information for the SU mode, and transmits the feedback information to the transmitting end. When all of the streams are selected (i.e., when the MU mode is not supported), the channel quality information includes only the channel quality information for the SU mode. When some streams are selected (i.e., when the MU mode is supported), the channel quality information includes the channel quality information of the two modes, the SU mode and the MU mode, and all of the modes. The feedback information includes the rank or the selected stream information and the per stream channel quality information of the selected streams. Using a beamforming scheme, the feedback information further includes the preceding index information. For example, the feedback information can employ one of the structures in FIG. 1.

Figure 6:
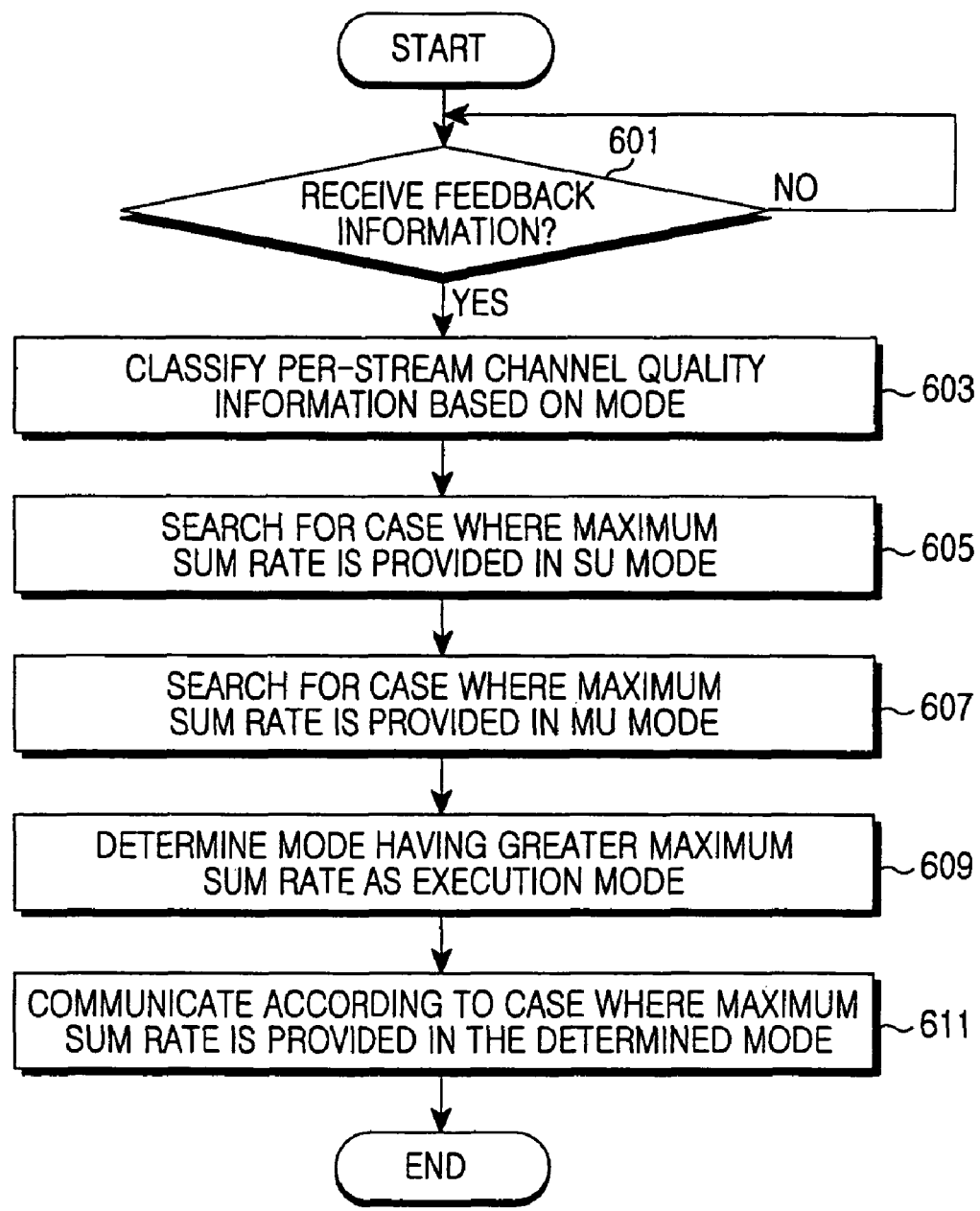
FIG. 6 illustrates a method of the transmitting end for determining a mode and users in the MIMO wireless communication system according to an exemplary embodiment of the present invention.

FIG. 6 is a flowchart illustrating a method of the transmitting end for determining a mode and users in the MIMO wireless communication system according to an exemplary embodiment of the present invention.

In step 601, the transmitting end checks whether the feedback information is received from the receiving ends. When the feedback information includes only the channel information for the SU mode, it implies that the corresponding receiving end supports only the SU mode. The feedback information includes the rank or the selected stream information and the per stream channel quality information of the selected streams. Using a beamforming scheme, the feedback information further includes the preceding index information. For example, the feedback information can employ one of the structures in FIG. 1.

Upon receiving the feedback information, the transmitting end classifies the per stream channel quality information of the feedback information based on the mode in step 603.

In step 605, the transmitting end searches for the case where the maximum sum rate is provided in the SU mode.

Namely, the transmitting end computes the sum rate of the SU mode communication with the receiving ends, and searches the maximum sum rate.

In step 607, the transmitting end searches the case where the maximum sum rate is provided in the MU mode. The transmitting end computes the sum rates of the communications using the possible combinations of the MU mode, and searches the maximum sum rate.

In step 609, the transmitting end compares the maximum sum rate of the two modes and determines the mode having the greater maximum sum rate as the execution mode.

In step 611, the transmitting end conducts communication in the determined mode according to the case providing the maximum sum rate.

As set forth above, in the MIMO wireless communication system, the feedback information for the SU mode and the MU mode are constituted for ML detection, and the mode and the users are determined based on the feedback information. Therefore, the performance of ML detection can be guaranteed, and the gain of the MIMO wireless communication system can be enhanced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a receiving end in a Multiple-Input Multiple-Output (MIMO) wireless communication system, the apparatus comprising:
    a selector configured to select at least one stream for a multiuser (MU) mode;
    a first generator configured to generate a plurality of per stream channel quality information for the at least one selected stream as a plurality of candidates for channel information for the MU mode; and
    a determiner configured to determine one per stream channel quality information from the candidates as channel information for the MU mode.

2. The apparatus of claim 1, further comprising:
    a second generator configured to select at least one stream for a single user (SU) mode and configured to generate per stream channel quality information for the SU mode,
    wherein the selector is configured to determine the at least one stream selected for the SU mode as at least one stream for the MU mode.

3. The apparatus of claim 1, wherein the first generator is configured to allocate a maximum modulation order to at least one unselected stream, sequentially allocate one or more possible modulation order combinations to the at least one selected stream, and generate per stream channel quality information of each of the modulation order combinations.

4. The apparatus of claim 3, wherein the first generator is configured to, with respect to each of the modulation order combinations, calculate a pairwise error rate (PER), calculate an upper bound of a per stream symbol error rate (SER) using the pairwise error rate, convert the upper bound of the symbol error rate to a channel quality, and calculate per stream channel qualities corresponding to the modulation order combinations.

5. The apparatus of claim 1, wherein the determiner is configured to determine per stream channel quality information corresponding to a modulation order combination that maximizes a sum rate of the selected stream among modulation order combinations meeting a required channel quality of a corresponding modulation order as channel information for the MU mode.

6. The apparatus of claim 1, further comprising:
    a constitutor configured to constitute feedback information that comprises the channel information for the MU mode determined at the determiner.

7. The apparatus of claim 6, wherein the constitutor is configured to constitute the feedback information that comprises at least one of: channel information for the MU mode, channel information for the SU mode, rank information, and precoding index information.

8. The apparatus of claim 7, wherein, when the receiving end supports only the SU mode, the constitutor constitutes a feedback information comprising only the channel information for the SU mode.

9. An apparatus for a transmitting end that communicates with a plurality of receiving ends in a Multiple-Input Multiple-Output (MIMO) wireless communication system, the apparatus comprising:
    a checker configured to check a feedback information received from the plurality of receiving ends; and
    a scheduler configured to:
        classify channel quality information included in the feedback information into a single user (SU) and a multi-user (MU) mode based on a rank included in the feedback information of each of the receiving ends,
        determine one of the SU mode or the MU mode based on the feedback information, and
        determine at least one receiving end with which to communicate.

10. The apparatus of claim 9, wherein the scheduler is configured to search cases where a maximum sum rate is provided in each mode, determine a mode having the greater maximum sum rate as an execution mode, and select at least one receiving end which provides the maximum sum rate in the determined mode.

11. An operating method of a receiving end in a Multiple-Input Multiple-Output (MIMO) wireless communication system, the method comprising:
    selecting at least one stream for a multiuser (MU) mode;
    generating a plurality of per stream channel quality information for the at least one selected stream, as a plurality of candidates for a channel information for the MU mode; and
    determining one per stream channel quality information from the candidates as channel information for the MU mode.

12. The operating method of claim 11, further comprising:
    selecting at least one stream for a single user (SU) mode and generating per stream channel quality information for the SU mode; and
    determining the at least one stream selected for the SU mode as at least one stream for the MU mode.

13. The operating method of claim 11, wherein generating the per stream channel quality information comprises:
    allocating a maximum modulation order to at least one unselected stream; and
    sequentially allocating possible modulation order combinations to the at least one selected stream and generating per stream channel quality information of each of the modulation order combinations.

14. The operating method of claim 13, wherein generating the per stream channel quality information for the modulation order combinations comprises;
    calculating a pairwise error rate (PER) with respect to each of the modulation order combinations;
    calculating an upper bound of a per stream symbol error rate (SER) using the pairwise error rate; and converting the upper bound of the symbol error rate to a channel quality and calculating per stream channel qualities corresponding to the modulation order combinations.

15. The operating method of claim 11, wherein determining the channel information for the MU mode comprises:
determining per stream channel quality information corresponding to a modulation order combination which maximizes a sum rate of the selected stream among modulation order combinations meeting a required channel quality of a corresponding modulation order, as channel information for the MU mode.

16. The operating method of claim 11, further comprising:
constituting a feedback information which comprises the channel information for the determined MU mode.

17. The operating method of claim 16, wherein the feedback information comprises at least one of channel information for the MU mode, channel information for the SU mode, rank information, and precoding index information.

18. The operating method of claim 17, wherein, when the receiving end supports only the SU mode, the feedback information comprises only the channel information for the SU mode.

19. An operating method of a transmitting end which communicates with a plurality of receiving ends in a Multiple-Input Multiple-Output (MIMO) wireless communication system, the method comprising:
checking a feedback information received from the receivers;
classifying channel quality information included in the feedback information into a single user (SU) and a multiuser (MU) mode based on a rank included in the feedback information of each of the receiving ends; and
determining one of the SU mode or the MU mode based on the feedback information and determining at least one receiving end with which to communicate.

20. The operating method of claim 19, wherein determining the mode and the at least one receiving end with which to communicate comprises:
searching cases where a maximum sum rate is provided in each mode; and
determining a mode having the greater maximum sum rate as an execution mode, and selecting at least one receiving end which provides the maximum sum rate in the determined mode.

* * * * *